US006969011B2

(12) United States Patent
Palmer

(10) Patent No.: US 6,969,011 B2
(45) Date of Patent: Nov. 29, 2005

(54) CHEMICAL ADDITIVE DISPENSING DEVICE FOR USE WITH A STATION OF AN IRRIGATION SYSTEM

(75) Inventor: Michael B. Palmer, 402 E. 18th St., Costa Mesa, CA (US) 92627

(73) Assignee: Michael B. Palmer, Costa Mesa, CA (US)

(*) Notice: Subject to any disclaimer, the term of this patent is extended or adjusted under 35 U.S.C. 154(b) by 0 days.

(21) Appl. No.: 10/748,651

(22) Filed: Dec. 30, 2003

(65) Prior Publication Data

US 2005/0145720 A1 Jul. 7, 2005

(51) Int. Cl.[7] ........................... A62C 5/02; E03B 11/00

(52) U.S. Cl. ...................... 239/310; 239/316; 239/317; 137/268

(58) Field of Search ................................ 239/310, 315, 239/317, 318, 200, 201, 203, 550, 551, 565, 239/DIG. 15; 137/268, 15.01; 210/261, 262

(56) References Cited

U.S. PATENT DOCUMENTS

| | | | | |
|---|---|---|---|---|
| D322,838 S | | 12/1991 | Hagedorn | |
| 5,294,212 A | * | 3/1994 | Mehoudar | 405/36 |
| 5,505,382 A | * | 4/1996 | Sealy et al. | 239/316 |
| 5,549,248 A | * | 8/1996 | Baker et al. | 239/251 |
| 6,036,110 A | * | 3/2000 | Kanatzar et al. | 239/317 |
| 6,161,779 A | * | 12/2000 | Oyler et al. | 239/310 |
| 6,267,303 B1 | | 7/2001 | Francis | |
| 6,540,156 B2 | * | 4/2003 | Martin | 239/310 |
| 6,618,977 B1 | * | 9/2003 | Curro | 43/1 |
| 6,722,583 B2 | * | 4/2004 | Restaino et al. | 239/310 |
| 2002/0027172 A1 | * | 3/2002 | Whiteley | 239/310 |

* cited by examiner

*Primary Examiner*—David A. Scherbel
*Assistant Examiner*—Seth Barney
(74) *Attorney, Agent, or Firm*—Blakely, Sokoloff, Taylor & Zafman LLP

(57) ABSTRACT

Disclosed is a chemical additive dispensing device for use with a station of a sprinkler-based irrigation system that includes a fluid diversion housing and a container for storing a chemical additive. The fluid diversion housing includes an in-flow channel formed therein that is in fluid communication with an input port and the container. An out-flow channel is also formed within the fluid diversion housing and is in fluid communication with an output port and the container. In operation, the container fills with fluid from the in-flow channel such that the fluid mixes with the chemical additive. Once the container is filled with fluid, the mixture of fluid and chemical additive is diverted through the out-flow channel of the fluid diversion housing to the outlet port such that the fluid chemical additive mixture is distributed to the rest of the irrigation system and particularly through sprinklers onto a lawn and/or plants.

17 Claims, 5 Drawing Sheets

CHEMICAL ADDITIVE DISPENSING DEVICE FOR USE WITH A STATION OF AN IRRIGATION SYSTEM

FIELD

Embodiments of the invention relate generally to irrigation systems, and particularly to a chemical additive dispensing device for use with a station of an irrigation system. Even more particularly, embodiments of the invention relate to a chemical additive dispensing device for use with a station of an irrigation system to introduce fertilizer or other desirable chemicals into the irrigation system such that they can be sprayed onto a lawn by the use of a sprinkler system.

DESCRIPTION OF RELATED ART

Irrigation systems that utilize sprinkler systems presently do not typically provide a way to easily introduce fertilizer and/or other desirable chemicals into the irrigation system. As a result, particularly in the residential or home environment, a homeowner must often spread or spray lawn chemicals in a separate and time-consuming operation onto a lawn or plants.

For example, devices presently exist that attach to the end of a garden hose such that a user can manually spread fertilizer or other chemicals onto his or her lawn or plants. Unfortunately, this is a time consuming process.

On the other hand, devices have been developed that automatically inject fertilizer or other chemical additives into a sprinkler-based irrigation system. However, these devices typically require extensive retro-fitting of the existing sprinkler-based irrigation system, are not easily installable by a homeowner, and are typically very complex in design.

SUMMARY

Embodiments of the present invention relate to a chemical additive dispensing device for use with a station of a sprinkler-based irrigation system. The chemical additive dispensing device is easily installable into an existing sprinkler-based irrigation system, is relatively simple in design, and is capable of low-cost manufacture.

In one aspect, the invention may be regarded as a chemical additive dispensing device for use with a station of a sprinkler-based irrigation system that includes a fluid diversion housing and a container coupled to the fluid diversion housing that stores a chemical additive.

The fluid diversion housing includes an input port for receipt of a first section of an outlet pipe that typically extends from the station of the irrigation system and an output port for receipt of a second section of the outlet pipe that provides fluid to the rest of the irrigation system typically including sprinklers. The input port and the outlet port are designed to be in fluid communication with each other such that the first and second sections of the outlet pipe are in fluid communication with one another.

An in-flow channel is formed within the fluid diversion housing that is in fluid communication with the input port and the container for diverting fluid from the input port into the container. An out-flow channel is formed within the fluid diversion housing that is in fluid communication with the output port and the container for diverting fluid from the container into the output port.

Once the chemical additive dispensing device is installed between the first section of the outlet pipe and the second section of the outlet pipe, in operation, the container fills with fluid from the in-flow channel such that the fluid mixes with the chemical additive. Once the container is filled with fluid, the mixture of fluid and chemical additive is diverted through the out-flow channel of the fluid diversion housing to the outlet port such that the fluid additive chemical mixture is distributed to the rest of the irrigation system, and particularly, through the sprinklers onto a lawn and/or plants. Typically, the amount of fluid diverted from the container through the out-flow channel is replaced at approximately the same rate from the in-flow channel.

In one embodiment, the fluid diversion housing may be formed by injection molding for low-cost manufacturing. Further, the fluid diversion housing may be formed from a plastic material.

In one embodiment, the fluid diversion housing may include a top plate and a bottom plate. The bottom plate may have the in-flow channel and out-flow channel formed therein. The top plate and the bottom plate may be secured to one another. Further, in one embodiment, the top plate and the bottom plate may be formed by injection molding for low-cost manufacturing. Further, the top and bottom plate may be formed from a plastic material.

Typically, the container is removably coupled to the fluid diversion housing. In one example, a chemical additive such as fertilizer may be stored in the container. For example, the fertilizer may be in the form of granular particles, but may also be in liquid or in tablet form.

Additionally, a diverter knob having an open and a closed position may be utilized with the fluid diversion housing. In the closed position, the diverter knob prevents fluid from flowing into the container and in the open position the diverter knob allows fluid to flow into the container.

The foregoing and other features of the invention are described in detail below and are set forth in the appended claims.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known mechanical structures, fasteners, valves, etc., are not described in detail, in order not to obscure the invention.

Figure 1:
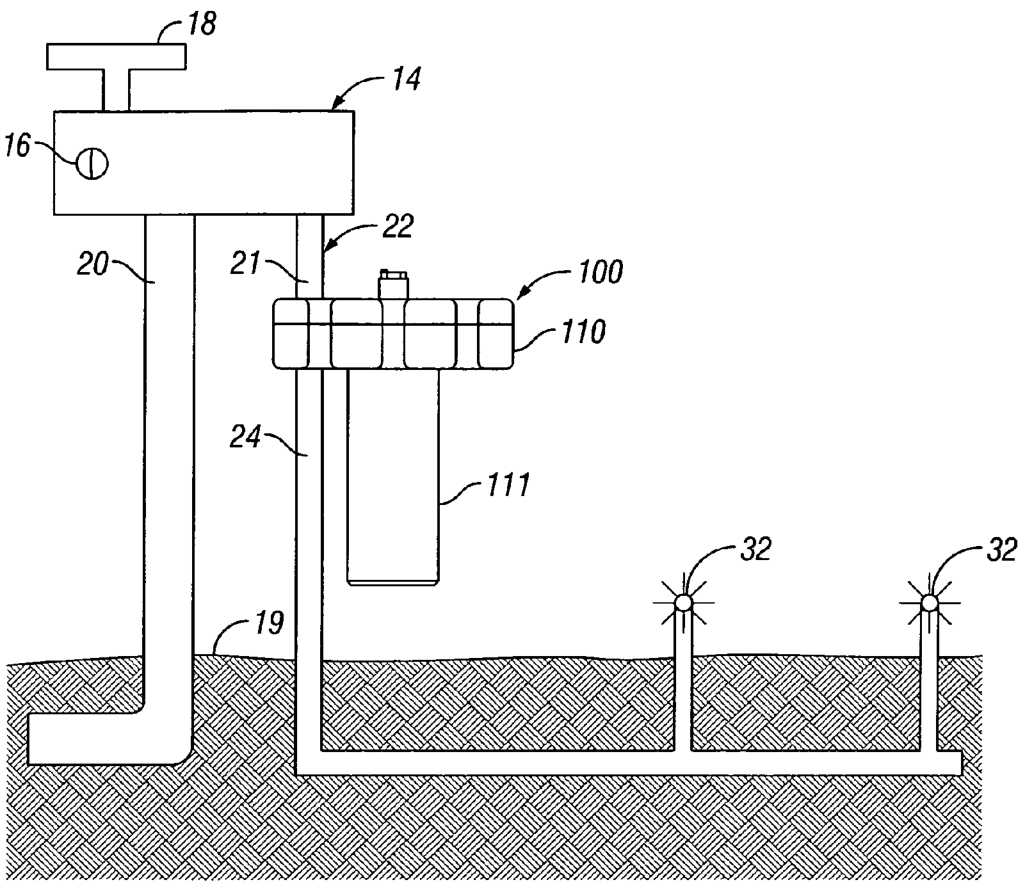
FIG. 1 shows a chemical additive dispensing device, according to one embodiment of the present invention, installed with a station of a typical sprinkler-based irrigation system.

With reference now to FIG. 1, FIG. 1 shows a chemical additive dispensing device according to one embodiment of the present invention installed with a station of a typical sprinkler-based irrigation system. As shown in FIG. 1, a typical sprinkler-based irrigation system 10 typically includes a station 14 having an anti-backflow valve 16 connected to a manual valve 18. The station 14 and anti-backflow valve 16 connect an inlet pipe 20 to an outlet pipe 22.

As shown in FIG. 1, typically the inlet pipe 20 extends from beneath the ground 19 into the station 14 and the station 14, by the use of anti-backflow valve 16, controls the flow of water to outlet pipe 22. The outlet pipe 22 further extends beneath the ground 19 and is coupled to a plurality of high pressure sprinklers 32.

Typically, the station 14 is located at the side of a house. The anti-backflow valve 16 is typically an anti-siphon valve with an electric solenoid that is utilized to prevent backflow into the water system. In many of today's residences, the station 14 and the anti-backflow valve 16 are connected to a timer system (e.g., typically in the garage) which controls the time and duration of the watering of a lawn and plants through the sprinklers 32. Also, a station 14 usually includes a manual valve 18 for the manual control of the valve 16 and the station 14.

In this example, water is delivered through inlet pipe 20 with input water from a standard residential water system at typical residential water pressure. Generally, inlet and outlet pipes 20 and 22 are typically polyvinyl chloride (PVC) pipes. However, it should be appreciated that many other suitable types of pipes may also be used in irrigation systems.

Thus, as an example when the anti-siphon valve with electric solenoid 16 is automatically turned on by a timer system, or by manual valve 18, valve 16 is opened and station 14 will allow water from inlet pipe 20 to flow off of the residential water system into outlet pipe 22 and to the sprinklers 32 to water a portion of a lawn and/or plants. Typically, a station 14 may be coupled to a suitable number of sprinkler heads 32 (e.g., 1–8 sprinkler heads) to cover a suitable area of lawn or plants. Although FIG. 1 only shows one station 14, it should be appreciated that typically a residence will have a suitable number of stations 14, each connected to a suitable number of sprinkler heads 32, in order to suitably water a desired area of lawn or plants.

Embodiments of the invention related to the chemical additive dispensing device will now be discussed. However, it should be appreciated that although an exemplary environment of a station 14 for a sprinkler-based residential irrigation system 10 has been previously described, in which examples of the operation of the chemical additive dispensing device will now be given, that the chemical additive dispensing device according to embodiments of the invention may be used in a wide variety of different environments.

In one aspect, embodiments of the invention relate to a chemical additive dispensing device 100 for use with a station 14 of a sprinkler-based irrigation system 10. The chemical additive dispensing device 100 includes a fluid diversion housing 110 and a container 111 coupled to fluid diversion housing 110 that stores a chemical additive such as fertilizer. The chemical additive dispensing device 100 automatically introduces a chemical additive to the water of the irrigation system 10 for distribution via the sprinklers 32 to a lawn and/or plants. The chemical additive dispensing device 100 is easily installable into an existing sprinkler-based irrigation system 10, is relatively simple in design, and as will be described is capable of low-cost manufacture.

Briefly, once the chemical additive dispensing device 100 is installed between a first section 21 of the outlet pipe 22 and a second section 24 of the outlet pipe 22, in operation, the container 111 fills with fluid from an in-flow channel of the fluid diversion housing 110 such that the fluid mixes with a chemical additive stored in the container 111. Once the container 111 is filled with fluid, the mixture of fluid and chemical additive is diverted through an out-flow channel of the fluid diversion housing 110 to an outlet port such that the fluid additive chemical mixture is distributed to the rest of the irrigation system, and particularly through the sprinklers 32 onto a lawn and/or plants.

It should be appreciated that the term fluid typically refers to water from a typical residential water system and the chemical additive utilized will typically be fertilizer. However, it should be appreciated that any sort of fluid and chemical additive may be utilized. Moreover, many different types of fertilizer may be utilized such as fertilizer in granular form, tablet form, liquid form, etc., and may be of a standard known brand such as MIRACLE GROW.

The structure and design of the chemical additive dispensing device 100 will now be discussed in more detail.

Figure 2:
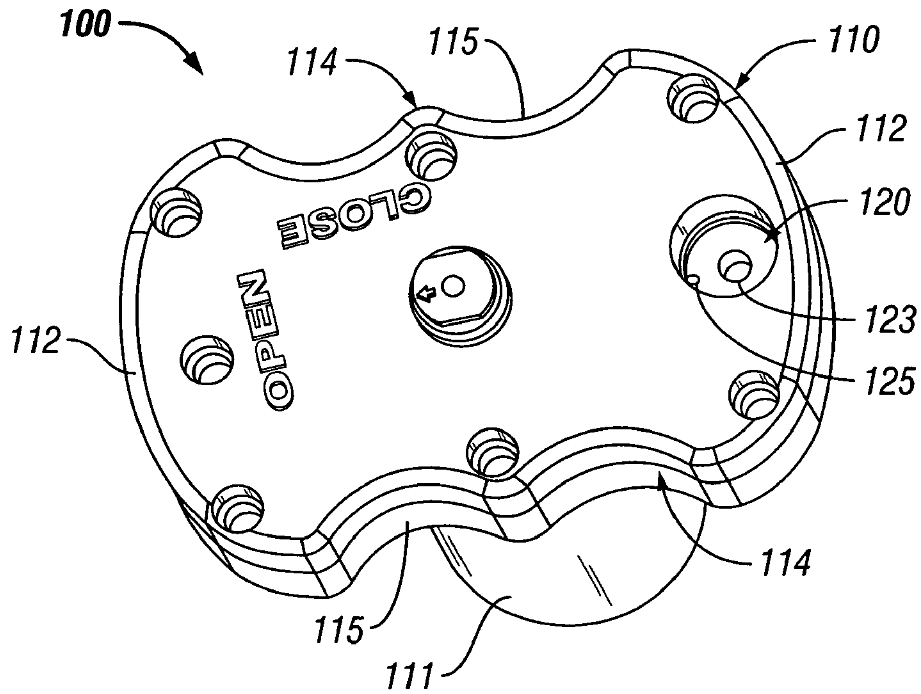
FIG. 2 shows a perspective view of the chemical additive dispensing device, according to one embodiment of the present invention.
Figure 3:
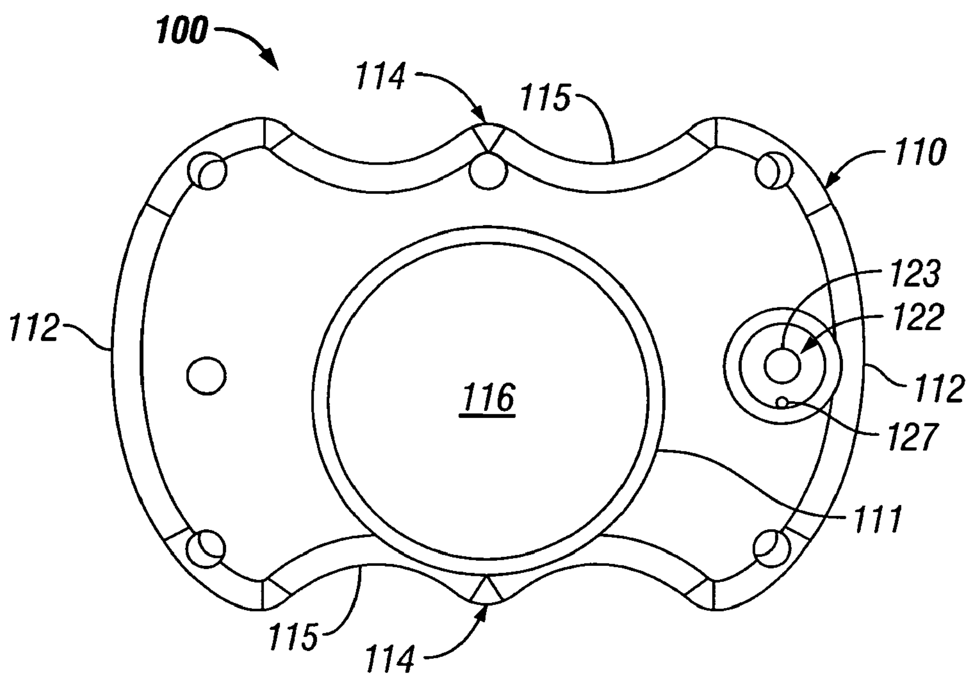
FIG. 3 shows a bottom view of the chemical additive dispensing device, according to one embodiment of the present invention.

FIGS. 2 and 3 show perspective and bottom views of the chemical additive dispensing device 100, respectively. With reference to FIGS. 2 and 3, the structure of the chemical additive dispensing device 100 will now be discussed in more detail. The fluid diversion housing 110 of the chemical additive dispensing device 100 includes opposed front and back rounded ends 112 and opposed sides 114 each having a pair of arcuate-shaped indentations 115. However, it should be appreciated that the fluid diversion housing 110 can be made in a variety of different shapes and that this is but one design.

The container 111 is typically cylindrical in shape having a closed bottom 116 in order to store a chemical additive. However, again, it should be appreciated that the container 111 can be made in a wide variety of different shapes. Further, the container 111 is typically removeably coupled to the fluid diversion housing 110.

The fluid diversion housing 110 includes an input port 120 for the receipt of a first section 21 of the outlet pipe 22 which typically extends from the station 14 of the irrigation system 10, and an output port 122 for receipt of a second section 24 of the outlet pipe 22 to provide fluid to the rest of the irrigation system and the sprinklers 32 (see also FIG. 1). The input port 120 and the output port 122 are in fluid communication with each other such that the first and second sections 21 and 24 of the outlet pipe 22 are in fluid communication with one another.

Particularly, input port 120 and output port 122 have a common fluid flow-through hole 123. The input port 120 also includes an inlet hole 125 to allow fluid flow into the fluid diversion housing 110. Similarly, the output port 122 includes an outlet hole 127 to allow fluid flow from the fluid diversion housing 110.

The installation of the chemical additive dispensing device 100 can best be seen with reference to FIGS. 2 and 3 in conjunction with FIG. 1. The chemical additive dispensing device 100 can easily be installed to a station 14 of a typical residential irrigation system 10 by cutting the typical PVC outlet pipe 22 at a first location to form a first section 21 and by installing this first section into the input port 120 of the fluid diversion housing 110. This can be done, for example, by utilizing PVC glue to secure the first section 21 of the PVC outlet pipe 22 to the input port 120 of the fluid diversion housing 110 or by other methods such as by utilizing suitable couplers. Similarly, the second section 24 of the PVC outlet pipe 22 can then be coupled to the output port 122 of the fluid diversion housing 110 by PVC glue or other suitable couplers such that the chemical additive dispensing device is mounted to the station 14 for use in the irrigation system 10.

Once the chemical additive dispensing device 100 has been installed between the first section 21 of the outlet pipe 22 and the second section 24 of the outlet pipe 22, in operation, the container 111 will fill with fluid from the input port 120 such that the fluid mixes with the chemical additive. Once the container 111 is filled with fluid, the mixture of fluid and chemical additive is diverted through the fluid diversion housing 110 to the outlet port 122 such that the fluid chemical additive mixture is distributed to the rest of the irrigation system 10 through outlet pipe 22, and particularly, through the sprinklers 32 onto a lawn and/or plants.

In one embodiment, fluid diversion housing 110 may be formed by injection molding for low-cost manufacturing and may be formed from a plastic material, a metalized plastic material, or other manufacturing material. Also, container 111 may also be made from plastic or another suitable material, and is removeably coupled to the fluid diversion housing 110. In this way, the container can be removed and, a chemical additive can be added, for each desired application of chemical additive by the sprinklers 32 onto a lawn and/or plants.

With reference now to the remaining figures, the structure and operation of the chemical additive dispensing device 100 will be discussed in even further detail. Particularly, with reference to FIG. 4, FIG. 4 shows a perspective view of the chemical additive dispensing device 100, according to one embodiment of the present invention.

Figure 4:
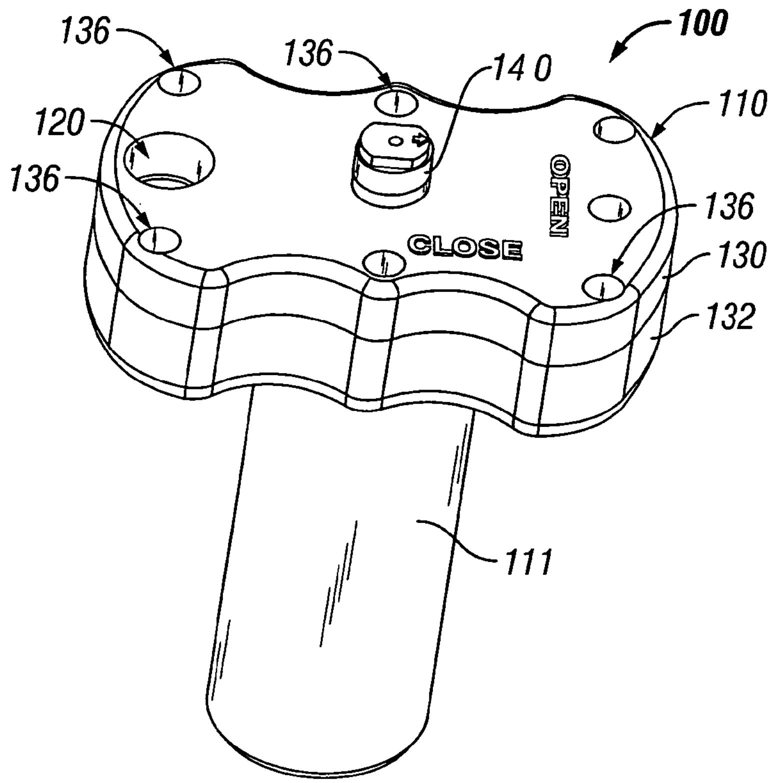
FIG. 4 shows a perspective view of the chemical additive dispensing device, according to one embodiment of the present invention.

As shown in FIG. 4, in one embodiment, the fluid diversion housing 110 includes a top plate 130 and a bottom plate 132. In this embodiment, the input port 120 is formed in the top plate 130. Also, formed within the input port 120 of the top plate is inlet hole 125. Further, the top plate 130 includes a plurality of mounting holes 136 through which suitable fasteners (not shown) such as screws, rivets, etc., may be mounted into aligned holes of the bottom plate 132 for securing the top plate 130 to the bottom plate 132. However, it should be appreciated that the top plate and the bottom plate may be secured to one another by other methods such as plastic welding, gluing, etc. Also, the top and bottom plate may be formed by injection molding for low-cost manufacturing and may be formed from suitable low-cost manufacturing materials such as plastic, metalized plastic, and/or other suitable materials.

Also, as shown in FIG. 4, a diverter knob 140 having an open and closed position may be utilized with the fluid diversion housing 110. In the closed position, the diverter knob 140 prevents fluid from flowing into the container 111 and in the open position the diverter knob allows fluid to flow into the container. The details of the diverter knob 140 will be discussed in more detail below.

Figure 5:
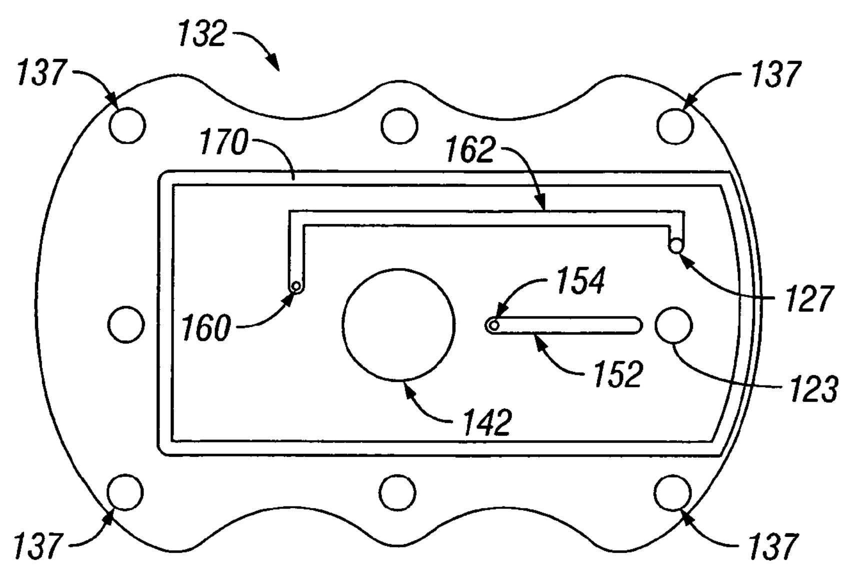
FIG. 5 is a top view of a bottom plate of a fluid diversion housing of the chemical additive dispensing device, according to one embodiment of the present invention.
Figure 6:
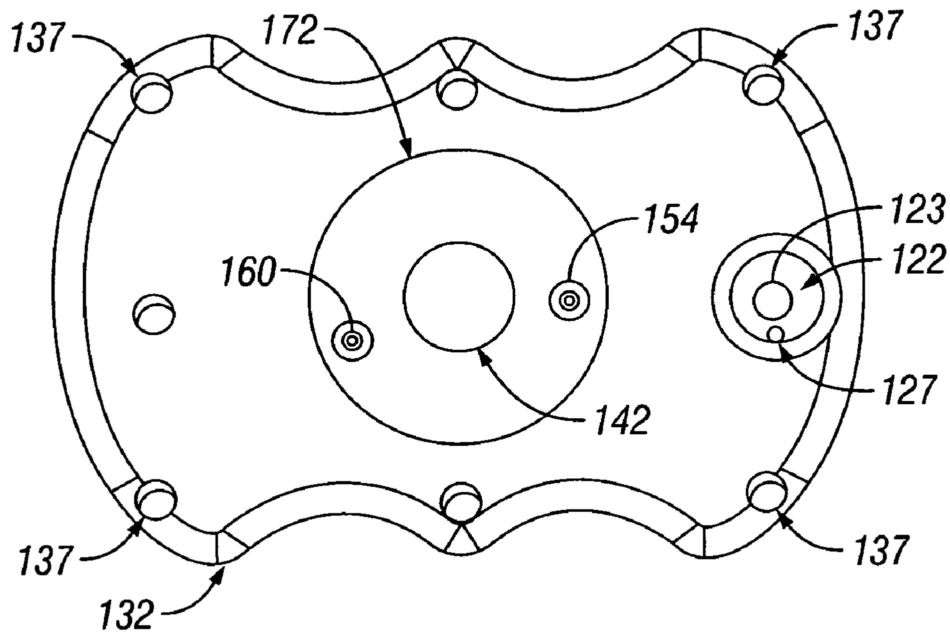
FIG. 6 is a bottom view of the bottom plate of the fluid diversion housing, according to one embodiment of the present invention.

Turning now to FIGS. 5 and 6, FIGS. 5 and 6 are top and bottom views of the bottom plate 132, respectively, illustrating the details of the bottom plate, according to one embodiment of the present invention. Looking particularly at FIG. 5, the bottom plate 132 includes a plurality of mounting holes 137 for receipt of suitable fasteners such as screws, rivets, etc. (not shown), in alignment with the mounting holes 136 of the top plate 130, as previously discussed, in order to secure the top plate 130 to the bottom plate 132. Alternatively, as previously discussed, the top and bottom plates may be secured to one another by other means such as plastic welding, etc.

Also, as can be seen in FIG. 5, the bottom plate includes a diverter knob mounting hole 142 for the receipt and mounting of diverter knob 140. The bottom plate also includes an in-flow channel 152 in fluid communication with the inlet hole 125 of input port 120 of the top plate 130 (FIG. 2) to divert fluid from the input port 120 through a down-hole 154 into the container 111. The bottom plate 132 further includes an up-hole 160 and an out-flow channel 162 in fluid communication with outlet hole 127 of the output port 122 for diverting fluid from container 111 into the output port 122 and to the rest of the irrigation system, as will be discussed.

Additionally, a silicon or rubber seal 170 may be located between the top and bottom plates 130 and 132 to ensure that the fluid is retained within the fluid diversion housing and does not leak out. Alternatively, instead of a silicon or rubber seal a solid plastic weld may be utilized instead.

Looking now to FIG. 6, FIG. 6 shows a bottom view of the bottom plate 132. As can be seen in FIG. 6 the bottom side of the bottom plate 132 includes a circular container receipt opening 172 for the receipt and mounting of the container 111. The container 111 is removeably coupled to the bottom plate 132 of the fluid diversion housing. The container 111 may be screwed into the container receipt opening, may be press fit, or may be secured by other means. Also, located within the container receipt opening 170 is the diverter knob opening 142 as well as the down-hole 154 of the in-flow channel and the up-hole 160 of the out-flow channel. Further, FIG. 6 shows the output port 122 including the outlet hole 127 for diverting fluid from the container through the output port and back into the outlet pipe of the irrigation system.

Figure 7:
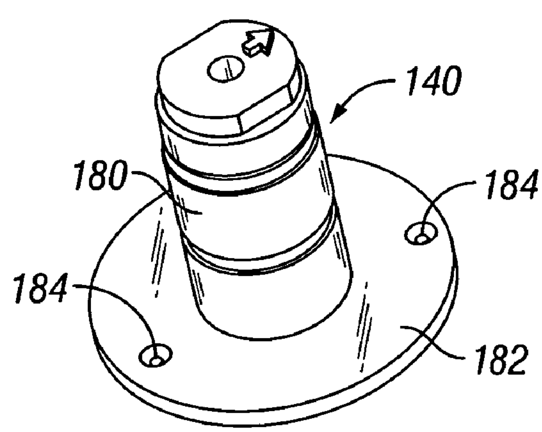
FIG. 7 is a perspective view of a diverter knob, according to one embodiment of the present invention.

Turning now to FIG. 7, FIG. 7 shows a perspective view of the diverter knob 140. In one embodiment, the chemical additive dispensing device may include a diverter knob 140 having an open and closed position to control fluid flow within the fluid diversion housing 110. In the closed position, the diverter knob 140 prevents fluid from flowing into the container 111 and in the open position the diverter knob allows fluid to flow into the container.

As shown in FIG. 7, the diverter knob 140 includes a cylindrical shaft 180 and an O-ring 182 having a pair of diverter knob holes 184.

The diverter knob 140 is mounted within the chemical additive dispensing device 100 by the cylindrical shaft 180 being mounted through the diverter knob mounting hole 142 of the bottom plate 132 and a correspondingly aligned diverter knob mounting hole of the top plate 130 such that the cylindrical shaft 180 extends above the top plate of the fluid diversion housing 110 (see FIG. 4). In this way, a user can grab the shaft 180 and toggle the diverter knob 140 between open and closed positions, respectively. The O-ring 182 is correspondingly seated within the circular container receipt opening 172 (see FIG. 6). Accordingly, in operation, when the diverter knob 140 is turned to the open position, diverter knob holes 184 align with the down-hole 154 and the up-hole 160 of the bottom plate 132 allowing fluid to flow into and from the container 111, respectively. Conversely, when the diverter knob 140 is turned to the closed position, the diverter knob holes 184 are not aligned with the down-hole 154 and the up-hole 160 such that O-ring 182 prevents fluid flow to and from the container 111.

Figure 8:
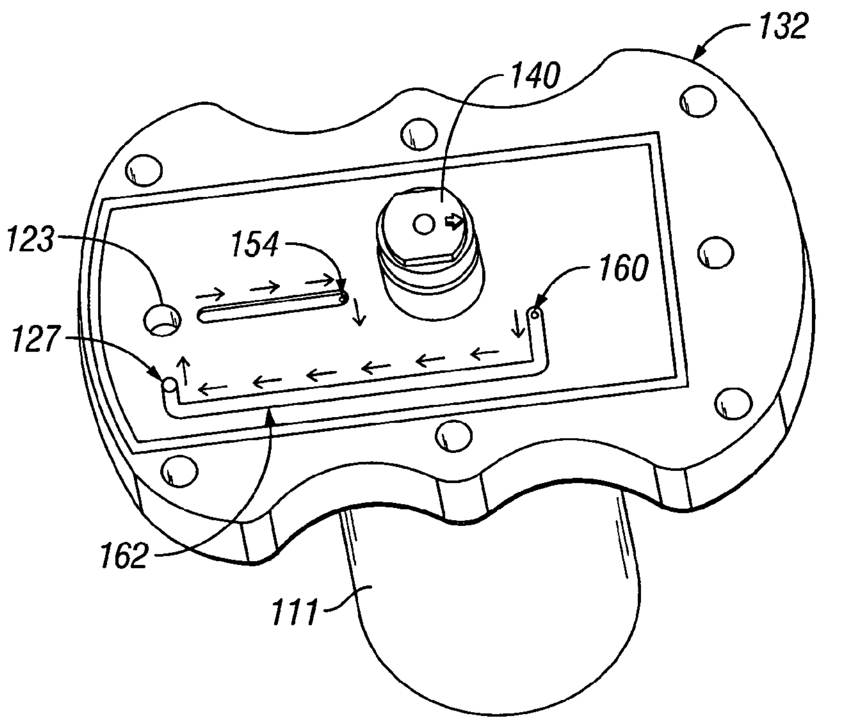
FIG. 8 is a perspective view of the bottom plate of the fluid diversion housing, which particularly illustrates fluid flow within the fluid diversion housing, according to one embodiment of the present invention.

With reference now to FIG. 8, FIG. 8 shows a perspective view of the bottom plate 132 and the container 111 and particularly illustrates fluid-flow within the fluid diversion housing, according to one embodiment of the present invention. Further, reference should also be made to FIG. 9, which shows a side view of the chemical additive dispensing device 110, and further illustrates fluid flow within the chemical additive dispensing device, according to one embodiment of the present invention.

Figure 9:
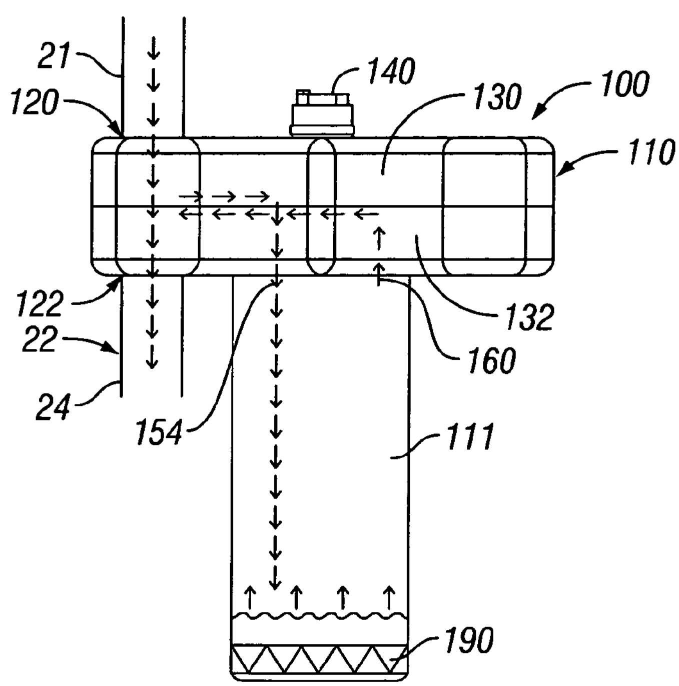
FIG. 9 is a side view of the chemical additive dispensing device, which particularly illustrates fluid flow within the chemical additive dispensing device, according to one embodiment of the present invention.

As can be seen in FIGS. 8 and 9, assuming that the chemical additive dispensing device 100 is installed to a station, fluid flows from the first section 21 of the outlet pipe 22 into the input port 120 of the top-plate 130, through common fluid flow-through hole 123 and through the output port 122 of the bottom plate 132 to the second section 24 of the outlet pipe 22 and through the rest of the irrigation system and to the sprinklers.

Further, when the diverter knob 140 is in the open position, fluid will flow from the inlet hole 125 of the input port 120 of the top plate 130 through in-flow channel 152 and through down-hole 154 into container 111. In this way, the fluid diversion housing 110 diverts fluid from the input port 120 into the container 111. It should be appreciated that if the diverter knob 140 is closed, the in-flow channel 152 will simply fill up with fluid, and fluid is not allowed to be diverted into the container 111.

Thus, in operation (as particularly shown in FIG. 9), the container 111 fills with fluid from the in-flow channel 152 of the fluid diversion housing 110 such that the fluid mixes with a chemical additive 190 stored in the container 111.

Once the container 111 is filled with fluid, the mixture of fluid and chemical additive is diverted through up-hole 160, through out-flow channel 162, and through outlet hole 127 to the output port 122 of the bottom plate 132 of the fluid diversion housing 110 such that the fluid chemical additive mixture is distributed through outlet pipe 22 to the rest of the irrigation system, and particularly through sprinklers to a lawn and/or plants. In one embodiment, when the container is made from a thermoplastic, such as a clear polycarbonate, the mixture of fluid and chemical additive can be seen changing colors by a user as it mixes.

It should be appreciated that, once the container 111 is filled with fluid, that the amount of fluid chemical additive mixture diverted from the container through out-flow channel 162 is replaced at approximately the same rate by fluid from the in-flow channel 154. Particularly, because fast flowing fluid at low pressure flows through the fluid flow-through hole 123 of the output port 122, due to Bernoulli's principal, the slow moving fluid at high pressure from out-flow channel 162 and through outlet hole 127 is actually drawn into the outlet port 122 for distribution through outlet pipe 22 to the rest of the irrigation system and sprinklers. Thus, typically, the amount of fluid diverted from the container 111 through the out-flow channel 162 is replaced at approximately the same rate from the in-flow channel 152. Also, it should be appreciated that by changing the size of the in-flow and out-flow channels, and the associated inlet, outlet, up and down holes, etc., that the rate at which fluid mixes with the chemical additive and the rate at which it is delivered to the rest of the irrigation system can be controlled.

Accordingly, embodiments of the invention provide a chemical additive dispensing device that is easily installable into an existing sprinkler-based irrigation system, is relatively simple in design, and is capable of low-cost manufacture. Further, because there are no moving parts in the chemical additive dispensing device, when it is in the open position, the chemical additive dispensing device tends to have low maintenance needs and tends to have a relatively long operational life.

Additionally, while embodiments of the invention have been described with reference to illustrative embodiments, these descriptions are not intended to be construed in a limiting sense. Various modifications of the illustrative embodiments, as well as other embodiments of the invention, which are apparent to a person skilled in the art to which embodiments of the invention pertain, are deemed to lie within the spirit and scope of the invention.

What is claimed is:

1. A chemical additive dispensing device for use with a station of an irrigation system comprising:

a fluid diversion housing having an input port receiving a first section of an outlet pipe extending from the station of the irrigation system and an output port receiving a second section of the outlet pipe that provides fluid to the rest of the irrigation system, the input port and the outlet port being in fluid communication such that the first and second sections of the outlet pipe are in fluid communication with one another;

a container coupled to the fluid diversion housing, the container to store a chemical additive;

an in-flow channel formed within the fluid diversion housing in approximately perpendicular relation to the input port, the in-flow channel being in fluid communication with the input port and including a down-hole for diverting fluid from the input port into the container; and an out-flow channel formed within the fluid diversion housing in approximately perpendicular relation to the output port, the out-flow channel being in fluid communication with the output port and including an up-hole for diverting fluid from the container through the out-flow channel into the output port;

wherein, in operation, the container is filled with fluid from the in-flow channel such that the fluid mixes with the chemical additive, and once the container is filled with fluid, the mixture of fluid and chemical additive is diverted through the out-flow channel to the output port such that the fluid chemical additive mixture is distributed to the rest of the irrigation system.

2. The chemical additive dispensing device of claim 1, wherein the top plate and the bottom plate are formed by injection molding.

3. The chemical additive dispensing device of claim 1, wherein the fluid diversion housing is formed from a plastic material.

4. The chemical additive dispensing device of claim 3, wherein the fluid diversion housing is formed by injection molding.

5. The chemical additive dispensing device of claim 1, wherein the container is removably coupled to the fluid diversion housing.

6. The chemical additive dispensing device of claim 1, wherein the chemical additive is a fertilizer.

7. The chemical additive dispensing device of claim 6, wherein the fertilizer is in the form of granular particles.

8. An irrigation system to automatically add a chemical additive, comprising:

at least one station having a valve to control the flow of fluid from an inlet pipe;

an outlet pipe to dispense fluid dependent on the position of the valve;

a chemical additive dispensing device comprising:

a fluid diversion housing including a top plate and a bottom plate, the top plate and the bottom plate being secured to one another, the fluid diversion housing having an input port receiving a first section of an outlet pipe extending from the station of the irrigation system and an output port receiving a second section of the outlet pipe that provides fluid the rest of the irrigation system, the input port and the outlet port being in fluid communication such that the first and second sections of the outlet pipe are in fluid communication with one another;

a container coupled to the fluid diversion housing, the container to store a chemical additive;

an in-flow channel formed within the bottom plate of the fluid diversion housing in approximately perpendicular relation to the input port, the in-flow channel being in fluid communication with the input port and including a down-hole for diverting fluid from the input port into the container; and an out-flow channel formed within the bottom plate of the fluid diversion housing in approximately perpendicular relation to the output port, the out-flow channel being in fluid communication with the output port and including an up-hole for diverting fluid from the container through the out-flow channel into the output port;

wherein, in operation, the container is filled with fluid from the in-flow channel such that the fluid mixes with the chemical additive, and once the container is filled with fluid, the mixture of fluid and chemical additive is diverted through the out-flow channel to the output port such that the fluid chemical additive mixture is distributed to the rest of the irrigation system.

9. The irrigation system of claim 8, wherein the top plate and the bottom plate are formed by injection molding.

10. The irrigation system of claim 8, wherein the fluid diversion housing is formed from a plastic material.

11. The irrigation system of claim 10, wherein the fluid diversion housing is formed by injection molding.

12. The irrigation system of claim 8, wherein the chemical additive is a fertilizer.

13. A method for adding a chemical additive at a station of an irrigation system comprising:

forming a fluid diversion housing including a top plate and a bottom plate being secured to one another, the fluid diversion housing having an input port receiving a first section of an outlet pipe extending from the station of the irrigation system and an output port receiving a second section of the outlet pipe that provides fluid to the rest of the irrigation system, the input port and the outlet port being in fluid communication such that the first and second sections of the outlet pipe are in fluid communication with one another;

coupling a container to the fluid diversion housing, the container to store a chemical additive;

forming an in-flow channel within the bottom plate of the fluid diversion housing in approximately perpendicular relation to the input port, the in-flow channel being in fluid communication with the input port and including a down-hole for diverting fluid from the input port into the container;

forming an out-flow channel within the bottom plate of the fluid diversion housing in approximately perpendicular relation to the output port, the output channel being in fluid communication with the output port and including a down-hole for diverting fluid from the container into the output port; and wherein, in operation, the container is filled with fluid from the in-flow channel such that the fluid mixes with the chemical additive, and once the container is filled with fluid, the mixture of fluid and chemical additive is diverted through the out-flow channel to the output port such that the fluid chemical additive mixture is distributed to the rest of the irrigation system.

14. The method of claim 13, wherein the top plate and the bottom plate are formed by injection molding.

15. The method of claim 13, wherein the fluid diversion housing is formed from a plastic material.

16. The method of claim 15, wherein the fluid diversion housing is formed by injection molding.

17. The method of claim 13, wherein the chemical additive is a fertilizer.

* * * * *